(12) United States Patent
Kramarov

(10) Patent No.: US 11,558,539 B2
(45) Date of Patent: Jan. 17, 2023

(54) SYSTEMS AND METHODS OF DETECTING AND IDENTIFYING AN OBJECT

(71) Applicant: Smart Supervision System LLC, Samara (RU)

(72) Inventor: Anton Kramarov, Samara (RU)

(73) Assignee: SMART SUPERVISION SYSTEM LLC, Samara (RU)

( * ) Notice: Subject to any disclaimer, the term of this patent is extended or adjusted under 35 U.S.C. 154(b) by 0 days.

(21) Appl. No.: 16/717,994

(22) Filed: Dec. 17, 2019

(65) Prior Publication Data

US 2020/0296278 A1  Sep. 17, 2020

Related U.S. Application Data

(60) Provisional application No. 62/817,714, filed on Mar. 13, 2019.

(51) Int. Cl.
*H04N 5/232* (2006.01)
*G06Q 10/08* (2012.01)
*G06V 20/20* (2022.01)

(52) U.S. Cl.
CPC ....... *H04N 5/23206* (2013.01); *G06Q 10/087* (2013.01); *G06V 20/20* (2022.01); *H04N 5/23218* (2018.08); *H04N 5/23299* (2018.08)

(58) Field of Classification Search
CPC ............ H04N 5/2256; H04N 5/23206; H04N 5/23299; H04N 5/23218; H04N 5/23296; G06K 9/00671; G06K 9/00771; G06K 9/209; G06Q 10/087
See application file for complete search history.

(56) References Cited

U.S. PATENT DOCUMENTS

| | | | |
|---|---|---|---|
| 4,819,015 A | 4/1989 | Bullivant et al. | |
| 6,668,074 B1 * | 12/2003 | Wilson | G06V 10/94 |
| | | | 382/218 |
| 7,168,618 B2 | 1/2007 | Schwartz | |
| 7,319,479 B1 | 1/2008 | Crabtree et al. | |
| 7,427,023 B2 | 9/2008 | Suenbuel | |

(Continued)

FOREIGN PATENT DOCUMENTS

| | | | | |
|---|---|---|---|---|
| AU | 2010257362 A1 * | 7/2012 | | |
| EP | 1701291 A2 * | 9/2006 | ......... | G06K 9/00771 |

(Continued)

*Primary Examiner* — Robert J Hance
(74) *Attorney, Agent, or Firm* — Kaufman & Canoles, P.C.

(57) ABSTRACT

Systems and methods of detecting and identifying objects are provided. In one exemplary embodiment, a method performed by one of a plurality of network nodes, with each network node having an optical sensor and being operable to wirelessly communicate with at least one other network node, comprises sending, by a network node over a wireless communication channel, to another network node, an indication associated with an object that is detected and identified by the network node based on one more images of that object that are captured by the optical sensor of the network node. Further, the detection and identification of the object is contemporaneous with the capture of the one or more images of that object. Also, the network node is operable to control a spatial orientation of the sensor so that the sensor has a viewing angle towards the object.

23 Claims, 9 Drawing Sheets

(56) References Cited

U.S. PATENT DOCUMENTS

| | | | |
|---|---|---|---|
| 7,673,464 B2 | 3/2010 | Bodin et al. | |
| 7,780,081 B1 | 8/2010 | Liang | |
| 7,844,509 B2 | 11/2010 | Bodin et al. | |
| 7,909,207 B2 | 3/2011 | Handfield et al. | |
| 7,961,104 B2 | 6/2011 | Bodin et al. | |
| 8,275,665 B2 | 9/2012 | Bodin et al. | |
| 8,321,330 B2 | 11/2012 | Kerschner et al. | |
| 8,473,374 B2 | 6/2013 | Mlison et al. | |
| 8,751,318 B2 | 6/2014 | Kim et al. | |
| 9,240,090 B2 | 1/2016 | Vogler et al. | |
| 9,275,361 B2 | 3/2016 | Meyer | |
| 9,473,747 B2 | 10/2016 | Kobres et al. | |
| 9,516,280 B1 | 12/2016 | Renkis | |
| 9,581,997 B1* | 2/2017 | Penilla | B60L 53/80 |
| 9,600,076 B2 | 3/2017 | Levesque et al. | |
| 9,727,838 B2 | 8/2017 | Campbell | |
| 9,875,481 B2 | 1/2018 | Pradhan et al. | |
| 9,928,695 B2 | 3/2018 | Hamada | |
| 9,984,355 B2 | 5/2018 | Jones et al. | |
| 10,001,402 B1 | 6/2018 | Gyori et al. | |
| 10,007,892 B1 | 6/2018 | Hahn et al. | |
| 10,062,100 B2 | 8/2018 | Alvarez et al. | |
| 10,064,502 B1 | 9/2018 | Gyori et al. | |
| 10,121,121 B1 | 11/2018 | De Bonet et al. | |
| 10,121,164 B2 | 11/2018 | Aoki et al. | |
| 10,129,507 B2 | 11/2018 | Landers et al. | |
| 10,130,195 B2 | 11/2018 | Phillips et al. | |
| 10,140,820 B1 | 11/2018 | Zalewski et al. | |
| 10,163,149 B1 | 12/2018 | Famularo et al. | |
| 10,192,087 B2 | 1/2019 | Davis et al. | |
| 10,198,710 B1 | 2/2019 | Hahn et al. | |
| 10,244,363 B1 | 3/2019 | Niranjayan et al. | |
| 10,251,144 B2 | 4/2019 | Blaser et al. | |
| 10,262,293 B1 | 4/2019 | Prater et al. | |
| 10,262,294 B1 | 4/2019 | Hahn et al. | |
| 10,282,720 B1* | 5/2019 | Buibas | G06V 20/52 |
| 10,282,852 B1 | 5/2019 | Buibas et al. | |
| 10,318,917 B1 | 6/2019 | Goldstein et al. | |
| 10,318,919 B2 | 6/2019 | Bermudez Rodriguez et al. | |
| 10,332,066 B1 | 6/2019 | Palaniappan et al. | |
| 11,126,861 B1* | 9/2021 | Evans | H04N 5/2256 |
| 2003/0018897 A1 | 1/2003 | Bellis et al. | |
| 2003/0233320 A1 | 12/2003 | Connor | |
| 2004/0073334 A1 | 4/2004 | Terranova | |
| 2005/0043857 A1 | 2/2005 | Van Fleet | |
| 2005/0171854 A1 | 8/2005 | Lyon | |
| 2005/0190072 A1 | 9/2005 | Brown et al. | |
| 2006/0149640 A1 | 7/2006 | Gordon et al. | |
| 2006/0178947 A1 | 8/2006 | Zsigmond et al. | |
| 2006/0238307 A1 | 10/2006 | Bauer et al. | |
| 2008/0052201 A1 | 2/2008 | Bodin et al. | |
| 2008/0189170 A1 | 8/2008 | Ramachandra | |
| 2012/0299749 A1* | 11/2012 | Xiao | G08G 1/148 |
| | | | 340/932.2 |
| 2013/0188886 A1* | 7/2013 | Petrou | G06K 9/6271 |
| | | | 382/305 |
| 2013/0284806 A1 | 10/2013 | Margalit | |
| 2013/0290112 A1 | 10/2013 | Davis et al. | |
| 2014/0043162 A1 | 2/2014 | Siciliano et al. | |
| 2014/0111647 A1* | 4/2014 | Atsmon | G08G 1/04 |
| | | | 348/148 |
| 2014/0214547 A1 | 7/2014 | Signorelli et al. | |
| 2015/0356345 A1* | 12/2015 | Velozo | G06V 40/161 |
| | | | 382/103 |
| 2016/0019514 A1 | 1/2016 | Landers et al. | |
| 2016/0026032 A1 | 1/2016 | Moore | |
| 2016/0063821 A1 | 3/2016 | MacIntosh et al. | |
| 2016/0104175 A1 | 4/2016 | Fanourgiakis et al. | |
| 2016/0110700 A1 | 4/2016 | Brosnan et al. | |
| 2016/0203699 A1 | 7/2016 | Mulhern et al. | |
| 2016/0253735 A1 | 9/2016 | Scudillo et al. | |
| 2016/0292484 A1* | 10/2016 | Hachimura | H04N 5/23296 |
| 2017/0111532 A1* | 4/2017 | Amtrup | G06T 3/0006 |
| 2017/0124603 A1 | 5/2017 | Olson | |
| 2017/0148005 A1 | 5/2017 | Murn | |
| 2017/0169440 A1 | 6/2017 | Dey et al. | |
| 2017/0249491 A1* | 8/2017 | MacIntosh | G06V 10/30 |
| 2017/0316372 A1 | 11/2017 | Thompson et al. | |
| 2017/0323359 A1 | 11/2017 | Dey et al. | |
| 2017/0344935 A1 | 11/2017 | Mattingly et al. | |
| 2018/0046975 A1 | 2/2018 | Jones et al. | |
| 2018/0078992 A1 | 3/2018 | High et al. | |
| 2018/0082245 A1 | 3/2018 | Jones et al. | |
| 2018/0096566 A1 | 4/2018 | Blair et al. | |
| 2018/0107970 A1 | 4/2018 | Jones et al. | |
| 2018/0114184 A1 | 4/2018 | Brooks et al. | |
| 2018/0137523 A1 | 5/2018 | Kim et al. | |
| 2018/0144292 A1 | 5/2018 | Mattingly et al. | |
| 2018/0164103 A1* | 6/2018 | Hill | G01C 21/206 |
| 2018/0165626 A1 | 6/2018 | Davidson et al. | |
| 2018/0165711 A1 | 6/2018 | Montemayor et al. | |
| 2018/0165728 A1 | 6/2018 | McDonald et al. | |
| 2018/0174096 A1 | 6/2018 | Daily et al. | |
| 2018/0181908 A1 | 6/2018 | Jones et al. | |
| 2018/0189722 A1 | 7/2018 | Aepli | |
| 2018/0197130 A1 | 7/2018 | Brooks et al. | |
| 2018/0204163 A1 | 7/2018 | Bender et al. | |
| 2018/0211208 A1 | 7/2018 | Winkle et al. | |
| 2018/0215544 A1 | 8/2018 | High et al. | |
| 2018/0218185 A1 | 8/2018 | High et al. | |
| 2018/0231973 A1 | 8/2018 | Mattingly et al. | |
| 2018/0232796 A1 | 8/2018 | Glaser et al. | |
| 2018/0242126 A1 | 8/2018 | Shah et al. | |
| 2018/0247264 A1 | 8/2018 | Taylor et al. | |
| 2018/0247361 A1 | 8/2018 | Tsuboi et al. | |
| 2018/0276480 A1* | 9/2018 | Peterson | G06V 40/103 |
| 2018/0285902 A1 | 10/2018 | Nazarian et al. | |
| 2018/0293537 A1 | 10/2018 | Kwok | |
| 2018/0306958 A1 | 10/2018 | Goss et al. | |
| 2018/0324349 A1* | 11/2018 | Kim | G06K 9/2063 |
| 2018/0365642 A1 | 12/2018 | Bonner et al. | |
| 2018/0365668 A1 | 12/2018 | Hay | |
| 2019/0043057 A1 | 2/2019 | Montgomery | |
| 2019/0073627 A1 | 3/2019 | Nakdimon et al. | |
| 2019/0078930 A1 | 3/2019 | Ravulapati | |
| 2019/0088096 A1* | 3/2019 | King | G08B 13/19665 |
| 2019/0095856 A1 | 3/2019 | Jones et al. | |
| 2019/0102837 A1 | 4/2019 | Smith et al. | |
| 2019/0108396 A1 | 4/2019 | Dal Mutto et al. | |
| 2019/0114488 A1 | 4/2019 | Glazer et al. | |
| 2019/0122292 A1 | 4/2019 | Riggins et al. | |
| 2019/0149725 A1* | 5/2019 | Adato | G06V 20/17 |
| | | | 348/158 |
| 2019/0156270 A1 | 5/2019 | Karmakar | |
| 2019/0156394 A1 | 5/2019 | Karmakar | |
| 2019/0164098 A1 | 5/2019 | Setchell et al. | |
| 2019/0172039 A1 | 6/2019 | Kambara et al. | |
| 2019/0180581 A1 | 6/2019 | Marszalek et al. | |
| 2019/0188435 A1 | 6/2019 | Davis et al. | |
| 2019/0188782 A1 | 6/2019 | Howard et al. | |
| 2019/0385008 A1* | 12/2019 | Kimura | G06K 9/6201 |
| 2021/0027318 A1* | 1/2021 | Yamasaki | G06Q 30/06 |

FOREIGN PATENT DOCUMENTS

| | | | |
|---|---|---|---|
| EP | 3249919 A1 * | 11/2017 | G06K 9/00228 |
| FR | 2806998 A1 * | 10/2001 | B62D 15/028 |

\* cited by examiner

SYSTEMS AND METHODS OF DETECTING AND IDENTIFYING AN OBJECT

CROSS REFERENCE TO RELATED APPLICATIONS

This application claims the benefit of U.S. Prov. App. No. 62/817,714, filed Mar. 13, 2019, which is hereby incorporated by reference as if fully set forth herein.

FIELD OF DISCLOSURE

The present invention relates generally to computer vision, artificial intelligence, and digital and analog signal processing. More specifically, the present invention relates to systems and methods of detecting and identifying objects.

BACKGROUND

In the retail environment, there is a need to autonomously detect, identify and classify retail products placed on a surface (e.g., shelf in an industrial, commercial or retail environment). In particular, such detection, identification, and classification of retail products may address various problems within a retail setting such as theft, out-of-stock product, misplaced product, and the like. Computer vision systems and artificial intelligence (AI) may utilize information about products and product locations on a surface to help resolve these problems. For instance, these systems can facilitate detection and/or prediction of out-of-stock or misplaced merchandise based on analysis of interactions between customers and specific product on a retail shelf. In current applications, products are detected, identified and classified by hand or through the use of video cameras and depth sensors.

In the retail environment, organizations are trying to find answers to various questions, including: What interests the buyer? How does the customer behave inside the store? How often and where does he go inside the store? Is there a product on the shelves that interests the client? Are the rules of laying out on the shelf observed?

There are numerous similar questions that interest retailers. Many answers to these questions may be obtained using computer vision and artificial intelligence (AI). For example, video cameras that may capture and transmit a video stream for further processing somewhere else on local or remote servers may be installed in a retail location. This approach may be used to identify a client and/or a client's sex, age, emotions, or the like. Further, this approach may calculate the frequency of visits, draw a heat map of the movement of customers inside the store, and so on. In this approach, the location of goods on the shelves of the store may be analyzed and compared with the planned layout to determine if products have ended up correctly on the shelves.

In addition, the use of computer vision and AI allows for various types of analysis of the staff working inside the store and/or monitoring the state of the store. For example, speech analysis may be performed to determine whether an employee is following established scripts. In another example, appearance of smoke within a room may be detected prior to smoke sensors in a ceiling detecting the smoke. In still another example, cleanliness of a floor may be observed and control.

In various existing solutions, information processing (e.g., video stream from many cameras, data from other sensors or the like) may be performed on local/remote servers of a retailer. And since the volume of collected information is extremely large, the implementation of this processing task requires a large server farm and a complex network infrastructure for data collection and storage, as well as complex and operationally expensive algorithms for information processing.

The high complexity and cost of these solutions is associated with the need to simultaneously transmit and synchronize an extremely large number of video streams and other data from sensors available at the facility in the processing center. In the process of collecting and sending information, there may be difficulties such as time delays and asynchronization in receiving information, loss of packets when sending and transporting, deterioration of the quality of transmitted information due to compression/encoding of the video stream for transmission, the complexity of synchronizing the work of various devices with each other and so on. The primary reason for the described difficulties lies in the field of remote processing of the huge data amount.

Accordingly, there is a need for improved techniques for detecting and identifying objects such as in a retail space. In addition, other desirable features and characteristics of the present disclosure will become apparent from the subsequent detailed description and embodiments, taken in conjunction with the accompanying figures and the foregoing technical field and background.

The Background section of this document is provided to place embodiments of the present disclosure in technological and operational context, to assist those of skill in the art in understanding their scope and utility. Unless explicitly identified as such, no statement herein is admitted to be prior art merely by its inclusion in the Background section.

SUMMARY

The following presents a simplified summary of the disclosure in order to provide a basic understanding to those of skill in the art. This summary is not an extensive overview of the disclosure and is not intended to identify key/critical elements of embodiments of the disclosure or to delineate the scope of the disclosure. The sole purpose of this summary is to present some concepts disclosed herein in a simplified form as a prelude to the more detailed description that is presented later.

Briefly described, embodiment of the present disclosure relate to systems and methods of detecting and identifying objects. According to one aspect, a method performed by one of a plurality of network nodes, with each network node having an optical sensor and being operable to wirelessly communicate with at least one other network node comprises sending, by a network node over a wireless communication channel, to another network node, an indication associated with an object that is detected and identified by the network node based on one more images of that object that are captured by the optical sensor of the network node. Further, the detection and identification of the object is contemporaneous with the capture of the one or more images of that object. Also, the network node is operable to control a spatial orientation of the sensor so that the sensor has a viewing angle towards the object and to control a focal length of the sensor so that the object is captured in a larger portion of each image.

According to another aspect, the method further includes detecting the object based on the one or more captured images.

According to another aspect, the method further includes identifying the object based on the one or more captured images responsive to detecting the object.

According to another aspect, the method further includes controlling the spatial orientation of the sensor so that the sensor has a viewing angle towards the object.

According to another aspect, the step of controlling the spatial orientation of the sensor includes controlling a pan or tilt of the sensor.

According to another aspect, the method further includes controlling the focal length of the sensor so that the object is captured in a larger portion of the image responsive to controlling the spatial orientation of the sensor so that the sensor has a viewing angle towards the object.

According to another aspect, the method further includes determining a distance and a direction of the object relative to the network node based on the spatial orientation of the sensor and a height of the sensor relative to a predetermined reference point.

According to another aspect, the indication of the object is associated with the distance and the direction of the object relative to the network node.

According to another aspect, the method further includes receiving, by the network node, from a spatial orientation sensor of the network node, a spatial orientation of the optical sensor.

According to another aspect, the method further includes determining an angle of inclination of the optical sensor relative to the object based on the spatial orientation of the optical sensor. The method also includes determining the distance of the object relative to the network node based on the angle of inclination of the optical sensor.

According to another aspect, the method further includes determining a direction of the object relative to the network node based on the spatial orientation of the optical sensor.

According to another aspect, the method further includes receiving, by the network node, from a global positioning system (GPS) receiver of the network node, a location of the network node. The method also includes determining the location of the object based on the location of the network node and the distance and the direction of the object relative to the network node. In addition, the indication of the object is associated with the location of the object.

According to another aspect, the method further includes determining whether a parking space is empty based on the detected and identified object, wherein the object is the parking space and the indication of the object is associated with whether that parking space is empty.

According to another aspect, the method further includes receiving, by the network node, from the optical sensor, the one or more images of the object.

According to another aspect, the plurality of network nodes is operable as a wireless mesh network.

According to another aspect, the wireless communication channel is associated with Bluetooth.

According to another aspect, the wireless communication channel is associated with Wi-Fi.

According to another aspect, the object is a parking space.

According to another aspect, the object is a human.

According to another aspect, the object is detected and identified within one second of the capture of the one or more images of that object.

According to another aspect, the object is detected and identified within five hundred milliseconds of the capture of the one or more images of that object.

According to another aspect, the object is detected and identified within one hundred milliseconds of the capture of the one or more images of that object.

According to one aspect, a network node comprises a processor and a memory, with the memory containing instructions executable by the processor, whereby the network node is configured to send, to another network node over a wireless communication channel, an indication associated with an object that is detected and identified by the network node based on one more images of that object that are captured by the optical sensor of that network node. Further, the detection and identification of the object is contemporaneous with the capture of the one or more images. Also, the network node is operable to control a spatial orientation of the sensor so that the sensor has a viewing angle towards the object and to control a focal length of the sensor so that the object is captured in a larger portion of each image.

According to one aspect, a method performed by one of a plurality of network nodes, with each network node having an optical sensor and being operable to wirelessly communicate with at least one other network node, comprises receiving, by a network node over a wireless communication channel, from another network node, an indication associated with an object that is detected and identified by the network node based on one more images of that object that are captured by the optical sensor of the other network node. Further, the detection and identification of the object is contemporaneous with the capture of the one or more images of that object. Also, the other network node is operable to control a spatial orientation of the sensor so that the sensor has a viewing angle towards the object and to control a focal length of the sensor so that the object is captured in a larger portion of each image.

According to one aspect, a network node comprises a processor and a memory, with the memory containing instructions executable by the processor, whereby the network node is configured to receive, from another network node over a wireless communication channel, an indication associated with an object that is detected and identified by the network node based on one more images of that object that are captured by the optical sensor of the other network node. Further, the detection and identification of the object is contemporaneous with the capture of the one or more images of that object. Also, the other network node is operable to control a spatial orientation of the sensor so that the sensor has a viewing angle towards the object and to control a focal length of the sensor so that the object is captured in a larger portion of each image.

According to one aspect, a camera comprises an image capture sensor, a memory, and a processor electrically coupled to the image capture sensor and the memory. Further, the processor is configured to control the image capture sensor to capture a plurality of images. Also, the processor is configured to process at least one of the plurality of images to perform object detection. In addition, the processor is configured to determine whether an object has been placed on or removed from a retail shelf based at least in part on the performed object detection.

According to another aspect, the camera further comprises a communication interface configured to enable communication via a link of a data communications network and the processor is configured to transmit, via the communication interface, at least one of the plurality of images to another camera, receive results of image processing performed by the other camera, and determine whether an object has been placed on or removed from a retail shelf based at least in part on the performed object detection and the received results.

According to another aspect, the camera further comprises a communication interface configured to enable communication via a link of a data communications network and the processor is configured to receive, via the communication interface, an image from another camera, process the received image to perform object detection, and send, via the communication interface, a result of the performed object detection to the other camera.

According to another aspect, the camera further comprises a communication interface configured to enable communication via a link of a data communications network and the processor is configured to transmit, via the communication interface, a result of the performed object detection to a sensor pad positioned on the retail shelf.

According to another aspect, the camera further comprises a communication interface configured to enable communication via a link of a data communications network and the processor is configured to receive, via the communication interface and from a sensor pad positioned on a retail shelf, an indication of whether an object has been placed on or removed from the retail shelf and determine whether the object has been placed on or removed from the retail shelf based at least in part on the performed object detection and the received indication.

According to another aspect, the camera further comprises an audio capture module and the processor is configured to control the audio capture module to capture audio, process the captured audio, and determine whether an object has been placed on or removed from a retail shelf based at least in part on the performed object detection and the processed captured audio.

According to another aspect, the processor is configured to determine, in response to determining that an object has been placed on a retail shelf, whether the object is properly placed on the retail shelf.

According to one aspect, a computer-implemented method of detecting an object placed on a retail shelf comprises capturing, by an image capture sensor of a camera, a plurality of images, processing at least one of the plurality of captured images to perform object detection, and determining whether an object has been placed on or removed from the retail shelf based at least in part on the performed object detection.

According to another aspect, the method further comprises transmitting at least one of the plurality of captured images to another camera, receiving a result of image processing performed by the other camera, and determining whether an object has been placed on or removed from the retail shelf based at least in part on the performed object detection and the received results.

According to another aspect, the method further comprises receiving an image from another camera, processing the image to perform object detection, and sending a result of the performed object detection to the other camera.

According to another aspect, the method further comprises transmitting a result of the performed object detection to a sensor pad positioned on the retail shelf.

According to another aspect, the method further comprises receiving, from a sensor pad placed on the retail shelf, an indication of whether an object has been placed on or removed from the retail shelf and determining whether the object has been placed on or removed from the retail shelf based at least in part on the performed object detection and the received indication.

According to another aspect, the method further comprises capturing audio by an audio capture module of the camera, processing the captured audio, and determining whether the object has been placed on or removed from the retail shelf based at least in part on the performed object detection and the processed captured audio.

According to another aspect, the method further comprises determining whether the object has been properly placed on the retail shelf in response to determining that the object has been placed on the retail shelf.

According to one aspect, a system comprises a plurality of cameras. In addition, each camera comprises an image capture sensor, a communications interface configured to enable communication via a link of a data communications network, a memory, and a processor electrically coupled to the image capture sensor, the communications interface, and the memory. Also, the processor is configured to control the image capture sensor to capture a plurality of images, process at least one of the plurality of captured images to perform object detection, and determine whether an object has been placed on or removed from a retail shelf based at least in part on the performed object detection.

According to another aspect, each processor is further configured to receive an image from one of the other cameras, process the received image to perform object detection, and send a result of the performed object detection to the other camera.

According to another aspect, each processor is further configured to transmit at least one of the plurality of images to one or more of the other cameras, receive results of image processing performed by the one or more other cameras, and determine whether an object has been placed on or removed from a retail shelf based at least in part on the performed object detection and the received results.

According to another aspect, the system further comprises a plurality of sensor pads positioned on a plurality of retail shelves. In addition, each processor is further configured to transmit a result of the performed object detection to one or more of the plurality of sensor pads.

According to another aspect, the system further comprises a plurality of sensor pads positioned on a plurality of retail shelves. In addition, each processor is configured to receive, from one of the plurality of sensor pads, an indication of whether an object has been placed on or removed from the retail shelf corresponding to the one sensor pad and determine whether the object has been placed on or removed from the retail shelf corresponding to the one sensor pad based at least in part on the performed object detection and the received indication.

According to another aspect, one or more of the plurality of cameras further comprises an audio capture module. In addition, each corresponding processor is further configured to control the audio capture module to capture audio, process the captured audio and determine whether an object has been placed on or removed from a retail shelf based at least in part on the performed object detection and the processed captured audio.

BRIEF DESCRIPTION OF THE DRAWINGS

The present disclosure will now be described more fully hereinafter with reference to the accompanying drawings, in which embodiments of the disclosure are shown. However, this disclosure should not be construed as limited to the embodiments set forth herein. Rather, these embodiments are provided so that this disclosure will be thorough and complete, and will fully convey the scope of the disclosure to those skilled in the art. Like numbers refer to like elements throughout.

DETAILED DESCRIPTION

For simplicity and illustrative purposes, the present disclosure is described by referring mainly to an exemplary embodiment thereof. In the following description, numerous specific details are set forth in order to provide a thorough understanding of the present disclosure. However, it will be readily apparent to one of ordinary skill in the art that the present disclosure may be practiced without limitation to these specific details.

Figure 1:
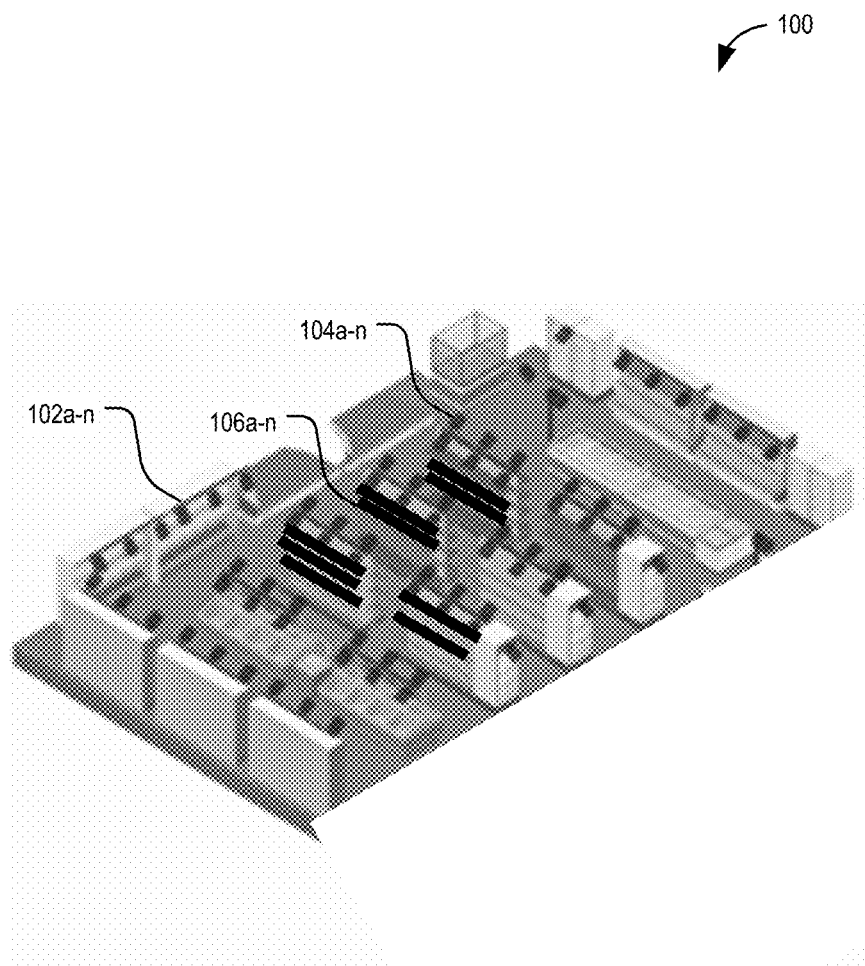
FIG. 1 illustrates one embodiment of a system of detecting and identifying an object in accordance with various aspects as described herein.

This disclosure describes systems and methods of detecting and identifying objects such as in a retail space. Furthermore, this disclosure describes systems and methods related to a multifunctional device in the field of video surveillance and computer vision technology. For example, FIG. 1 illustrates one embodiment of a system 100 of detecting and identifying objects within a retail space in accordance with various aspects as described herein. In FIG. 1, the system 100 includes a plurality of retail shelves 102a-n, a plurality of camera systems 104a-n, and a plurality of sensor pads 106a-n. Although not explicitly shown, the plurality of camera systems 104a . . . n and the plurality of sensor pads 106a-n may be interconnected via a wired or wireless data communications network. The data communications network may include, for example Wi-Fi, Bluetooth, short-range radio frequency (RF), cellular, and/or some combination of these technologies.

In various embodiments, each of the plurality of camera systems 104a-n may be configured to capture a plurality of images (e.g., streaming video) corresponding to a particular region or area. For example, the camera system 104a may be configured to capture images of a section of the corresponding retail shelf 102a on which the sensor pad 106a is positioned. Each of the camera systems 104a-n may also be configured to process at least one of the captured images to perform object detection, identification, classification, or the like. That is, in various embodiments, each camera system 104a-n is operable to perform image analysis without the need to send bandwidth-intensive images or video to a server or other data processing element. Each camera system 104a-n may be configured to determine whether an object has been placed on or removed from a retail shelf 102a-n based at least in part on the performed object detection. For example, based at least in part on performing object detection, the camera system 104a may be able to determine whether an object has been placed on or removed from the corresponding retail shelf 102a.

In one embodiment, each camera system 104a-n may be further configured to transmit one or more images to one of the other camera systems 104a-n for processing and receive processing results from the other camera system 104a-n in order to determine whether an object has been placed on or removed from a retail shelf 102a-n. In turn, each camera system 104a-n may be further configured to receive one or more images from another camera system 104a-n, process the one or more images to perform object detection, identification, classification, the like, or any combination thereof, and send a result of the performed function(s) back to the other camera system 104a-n. That is, the cameras system 104a-n may perform distributed processing amongst themselves. For instance, the camera system 104a may capture a plurality of images of an individual reaching for and retrieving an object from the corresponding retail shelf 102a. However, due to increased processing by the camera system 104a (e.g., rapidly capturing images, detecting additional objects, etc.), the camera system 104a may be unable to perform all of the necessary processing contemporaneous with the capture of such images or within a predetermined amount of time. In this scenario, the camera system 104a may share images with another camera system 104b that is currently underutilized and may request that the camera system 104b perform processing on behalf of the camera system 104a. Once that processing is completed, the results may be returned to that camera system 104a in order to determine whether an object has been placed on or removed from the corresponding retail shelf 102a.

In one embodiment, each camera system 104a-n may be further configured to receive, from a sensor pad 106a-n, an indication of whether an object has been placed on or removed from a corresponding retail shelf 102a-n and may determine whether the object has been placed on or removed from that retail shelf 102a-n based at least in part on the performed object detection and the received indication. In addition, each camera system 104a-n may be further configured to send a result of the performed object detection to a sensor pad 106a-n positioned on a corresponding retail shelf 102a-n. In various embodiments, each sensor pad 106a-n may be configured to determine whether an object has been placed on or removed from it based at least in part on weight and/or other measurements performed by sensors disposed in the sensor pad 106a-n. In one example, the sensor pad 106a may be configured to determine whether an object has been placed on or removed from the corresponding retail shelf 102a based on weight and/or other measurements performed by sensors disposed in the sensor pad 106a. In this example, the sensor pad 106a may send an indication of whether the object has been placed on or removed from the corresponding retail shelf 102a to the camera system 104a. In turn, the camera system 104a may utilize the received indication as part of its determination of whether an object has been placed on or removed from retail shelf 102a. In another example, the camera system 104a may perform object detection on one or more images or streamed video and share the results of the performed object detection with the sensor pad 106a. In this example, the sensor pad 106a may utilize the results of the performed object detection received from the camera system 104a in order to determine whether an object has been placed on or removed from the corresponding retail shelf 102a.

In another embodiment, each camera system 104a-n may also include an audio capture module such as a microphone or the like. Each camera system 104a-n may be further configured to capture audio from a surrounding area, process the captured audio, and determine whether an object has been placed on or removed from a corresponding retail shelf 102a-n based at least in part on the performed object detection and the processed captured audio.

Figure 2:
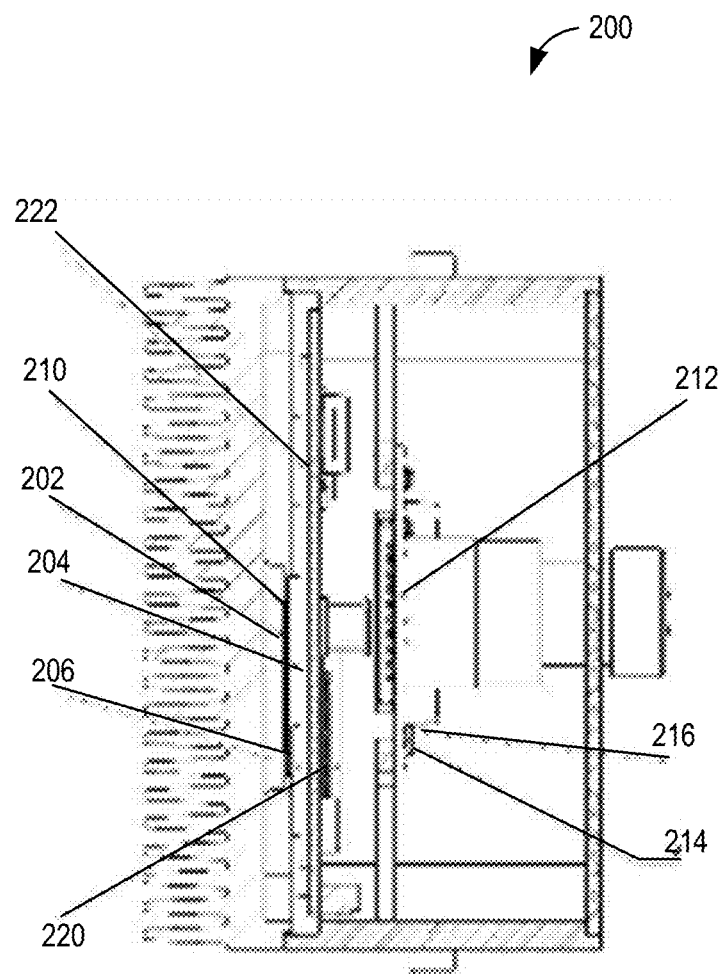
FIG. 2 illustrates one embodiment of a camera system in accordance with various aspects as described herein.

FIG. 2 illustrates one embodiment of a camera system 200 in accordance with various aspects as described herein. In FIG. 2, the camera system 200 may include a central processing unit (CPU) 202 (e.g., processor), a random access memory (RAM) 204, a flash memory 206, a network processing unit (NPU) 210, an optical or image sensor 212, a three-axis compass 214 (e.g., magnetometer), an accelerometer/gyroscope 216, a Wi-Fi/Bluetooth/cellular transceiver module 220, a radio frequency (RF) module 222, the like, or any combination thereof. In one embodiment, the optical or image sensor 212 may be a CMOS video sensor.

In various embodiments, the CPU 202 may be configured such that the camera system 200 may perform various processing functions without a need to share information with a local/remote server and/or other centralized processing device. For example, the CPU 202 may be configured to process one or more captured images to perform object detection. In addition, the CPU 202 may be configured such that the camera system 200 may perform various processing functions on behalf of other cameras and/or may utilize other cameras to perform various processing functions.

Figure 3:
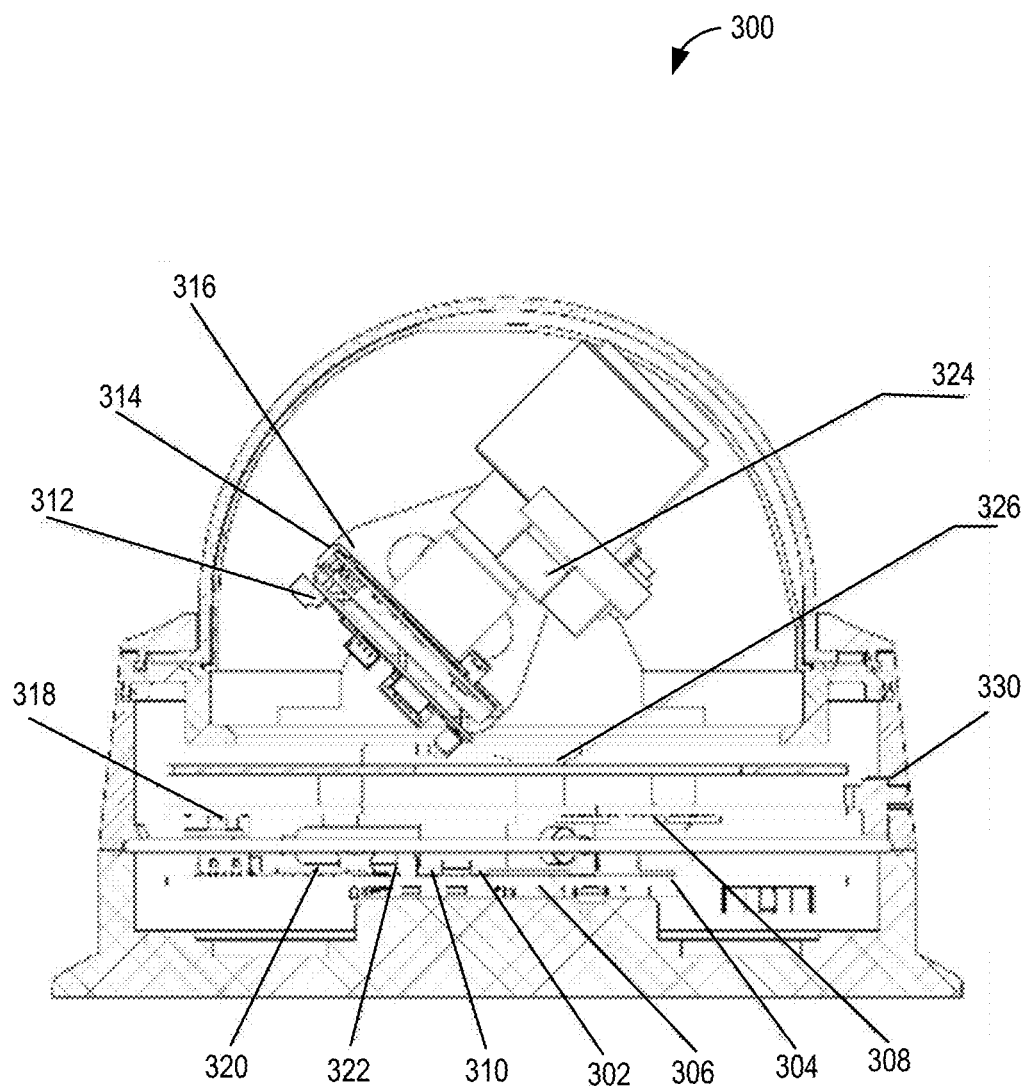
FIG. 3 illustrates another embodiment of a camera system in accordance with various aspects as described herein.

FIG. 3 illustrates another embodiment of a camera system 300 in accordance with various aspects as described herein. In FIG. 3, the camera system 300 may include a CPU 302, a RAM 304, a flash memory 306, a field programmable gate array (FPGA) 308, an NPU 310, an optical or image sensor 312, a three-axis compass 314, an accelerometer/gyroscope 316, a cellular transceiver module 318, a Wi-Fi/Bluetooth module 320, an RF module 322, a first motor(s)/servo(s) 324, a second motor(s)/servo(s) 326, an audio capture module 330, the like, or any combination thereof. The image sensor 312 may be a CMOS video sensor. The first motor(s)/servo(s) 324 may be configured to control focus and/or zoom of the camera system 300. Further, the second motor(s)/servo(s) 326 may be configured to control tilt and/or pan of the camera system 300.

In various embodiments, the CPU 302 may be configured such that the camera system 300 may perform various processing functions without a need to share information with a local/remote server and/or other centralized processing device. For example, the CPU 302 may be configured to process one or more captured images to perform object detection. In addition, the CPU 302 may be configured such that the camera system 300 may perform various processing functions on behalf of other cameras and/or utilize other cameras to perform various processing functions.

While the camera system 200 and the camera system 300 are similar in many respects and each may be able to perform similar processing functions, the two camera systems 200, 300 have differences. For instance, the camera system 200 may not include a motor(s)/servo(s). As such, the camera system 200 may be limited to a smaller field of view. In comparison, the camera system 300 may be able to capture images from a larger field of view (e.g., 360 rotatable view). In FIG. 1, for example, a portion of the camera systems 104a-n may be the same or similar to the camera system 200, with each of these camera systems 104a-n being positioned with a field of view towards a specific portion of the retail space. Further, the remaining camera systems 104a-n may be the same or similar to the camera system 300, with each of these camera systems 104a-n being positioned to have a much larger field of view or dynamically rotatable to have a much larger field of view (e.g., all or a portion of an aisle, a plurality of retail shelves, or the like) than the field of view of the other camera systems 104a-n.

Figure 4:
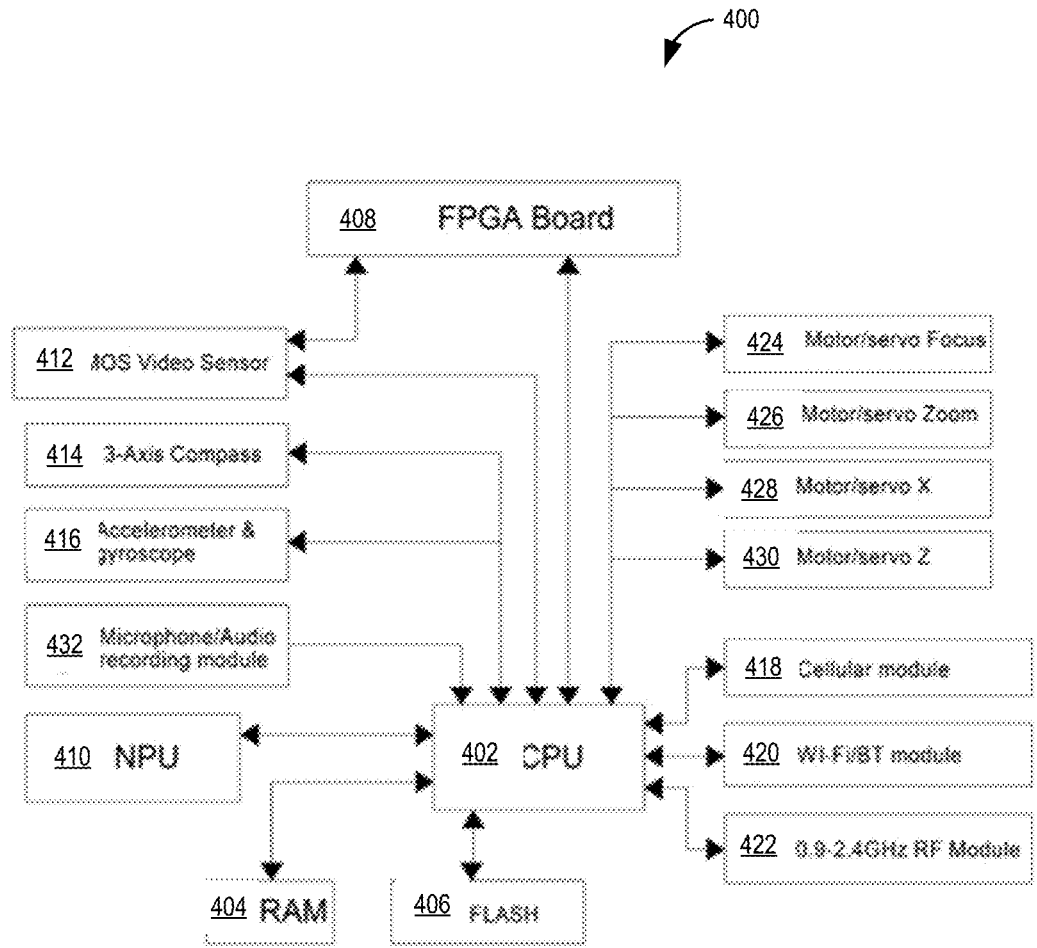
FIG. 4 illustrates one embodiment of a method performed by a camera system of detecting and identifying an object in accordance with various aspects as described herein.

FIG. 4 illustrates one embodiment of a camera system 400 in accordance with various aspects as described herein. In FIG. 4, the camera system 400 may include a CPU 402, a RAM 404, a flash 406, an FPGA board 408, an NPU 410, a CMOS video sensor 412, a three-axis compass 414, an accelerometer/gyroscope 416, a cellular module 418, a Wi-Fi/Bluetooth module 420, an RF module 422, a motor(s)/servo(s) 424 configured to control focus, a motor(s)/servo(s) 426 configured to control zoom, a motor(s)/servo(s) 428 configured to control a first aspect (e.g., yaw, roll or pitch), a motor(s)/servo(s) 430 configured to control a second aspect (e.g., yaw, roll, or pitch), and audio recording module 432.

In another embodiment, the various camera systems 200, 300, 400 share similar principles of operation and each may perform data analysis such as on image, video, or other data at the place of data collection and facilitate making a conclusion regarding recorded events. Thus, the various camera systems 200, 300, 400 may facilitate implementation of edge computing. In one definition, edge computing is a distributed computing structure that brings computation and data storage closer to the location where it is needed such as to improve response times and save data bandwidth.

The camera systems 200, 300, 400 provide various advantages, including: providing a lower cost system solution; reducing installation costs by avoiding construction, preparatory and installation work related to cabling, installation of multiple sensors and other equipment (e.g., sensors, cameras, switches, computer modules, etc.); and allowing a reduced bandwidth network solution by processing image/video data by the same camera system 200, 300, 400 that captured the image/video data and without sending or forwarding any of that image/video data to another camera. This approach greatly simplifies the construction and subsequent operation of the video analytics system and decision-making and significantly reduces the requirement for the bandwidth of the communication channel, as well as the computing power of the server part (with remote data processing). When implementing this approach, only the necessary small amount of metadata is transmitted from each camera system 200, 300, 400 such as to report a specific completed output or a committed event (e.g., status of a detected/identified retail item). This approach avoids sending large amounts of data (e.g., image/video data) from each camera system 200, 300, 400. As such, a communication channel in this implementation can be a wireless communication channel (cellular, WIFI, Bluetooth, or the like).

In another embodiment, each camera system 200, 300, 400 includes the necessary computing power inside the camera system for image/video data processing without having to send or forward that image/video data to another system. In contrast, most available video cameras from video surveillance systems are designed to perform one simple task—to record what is happening and transmit the video stream through the communication channel. Thus, each camera system 200, 300, 400 may have sufficient computing power to perform those tasks on the captured image/video data so that that captured image/video data does not have to be sent to another network node for any processing. Each camera system 200, 300, 400 may a size that is comparable to a conventional video camera. Such limited size and expanded computational power may be achieved via an ARM microprocessor, a programmable FPGA, the like, or any combination thereof.

In each embodiment, each camera system 200, 300, 400 may be operable to receive and transmit on a wireless communication channel. In the absence of the need to transfer a large volume of image/video data (e.g., video streams), lower bandwidth communication channels such as cellular, Wi-Fi, Bluetooth, or the like may be utilized. This approach greatly simplifies the implementation and operation of such data processing systems. In addition, support for radio standards such as Bluetooth Low Energy (BLE) and/or Wi-Fi makes the device in question easily integrated into already established and functioning systems. The presence of only BLE gives ample opportunities in the implementation of interactive interaction with the user. For example, on the basis of the resolution of the device, it is possible to implement the framework for indoor positioning systems (IPS) in combination with a WiFi-BLE-Image that can significantly extend the application possibilities of hardware-software complex on the basis of this device.

In another embodiment, each camera system 200, 300, 400 may include the ability to change the focal length. With the ability to change the focal length, cameras may be located in more disparate locations.

In another embodiment, each camera system 200, 300, 400 may include the possibility of changing the angle of pan/tilt camera. This also facilitates locating cameras in disparate locations.

In another embodiment, each camera system 200, 300, 400 may also include the ability to calculate the angle of inclination of the camera of the camera system 200, 300, 400. To navigate to a specific free parking space or to correctly determine the location of a person inside the store, the coordinates of the parking space or person must be accurately calculated. This problem can be solved by calculating the angle of inclination of the device relative to the plane of the parking lot or the floor in the store, if you know the height of the installation of the device. It is for this purpose that the gyroscope (to determine the angles of inclination of the device) became a necessary component of this device. Knowing the angle of inclination and installation height of the device with the help of geometric calculations, the distance to any point of capture in the frame, and therefore relative to the camera itself, can be determined with coordinates in space to the point of fixation.

In another embodiment, each camera system 200, 300, 400 may facilitate extensive wireless integration with third-party devices for data transmission. Integration with all kinds of sensors, devices, or mechanisms via a wireless data link may be required. Taking into account the current level of development of radio technologies, such integration is possible in the range from 400 MHz to 5 GHz. In accordance with the above factor, there is a need to use a radio frequency module in the device that supports partially or completely the described wave spectrum.

In another embodiment, the combination within a single device of all the components described above, as well as synchronization of the interaction between each other within a single platform, is a unique solution for the industry, which distinguishes the described single multifunctional device from the class of video cameras (based on the presence of specific components, such as accelerometer, magnetometer, etc., large computing power, as well as wide communication capabilities of the device), computers and servers (due to the presence in the device of many specific components, not inherent in computers) or other fixation devices (all kinds of sensors, radars, speed meters, etc.) information processing.

In another embodiment, the symbiosis of performance and specific application of FPGAs together with the ARM architecture processor significantly increases the efficiency of fog computing systems. Given the flexibility of FPGA-based platforms, this complex can be upgraded with almost any digital device with any digital interface. The addition of the system with the ADC unit in conjunction with the FPGA allows you to build a receiver controlled by the SDR network, the addition of the complex with a magnetometer allows you to take pictures when approaching, cars (in order to save electricity with the autonomous power of the complex) and so on.

Figure 5:
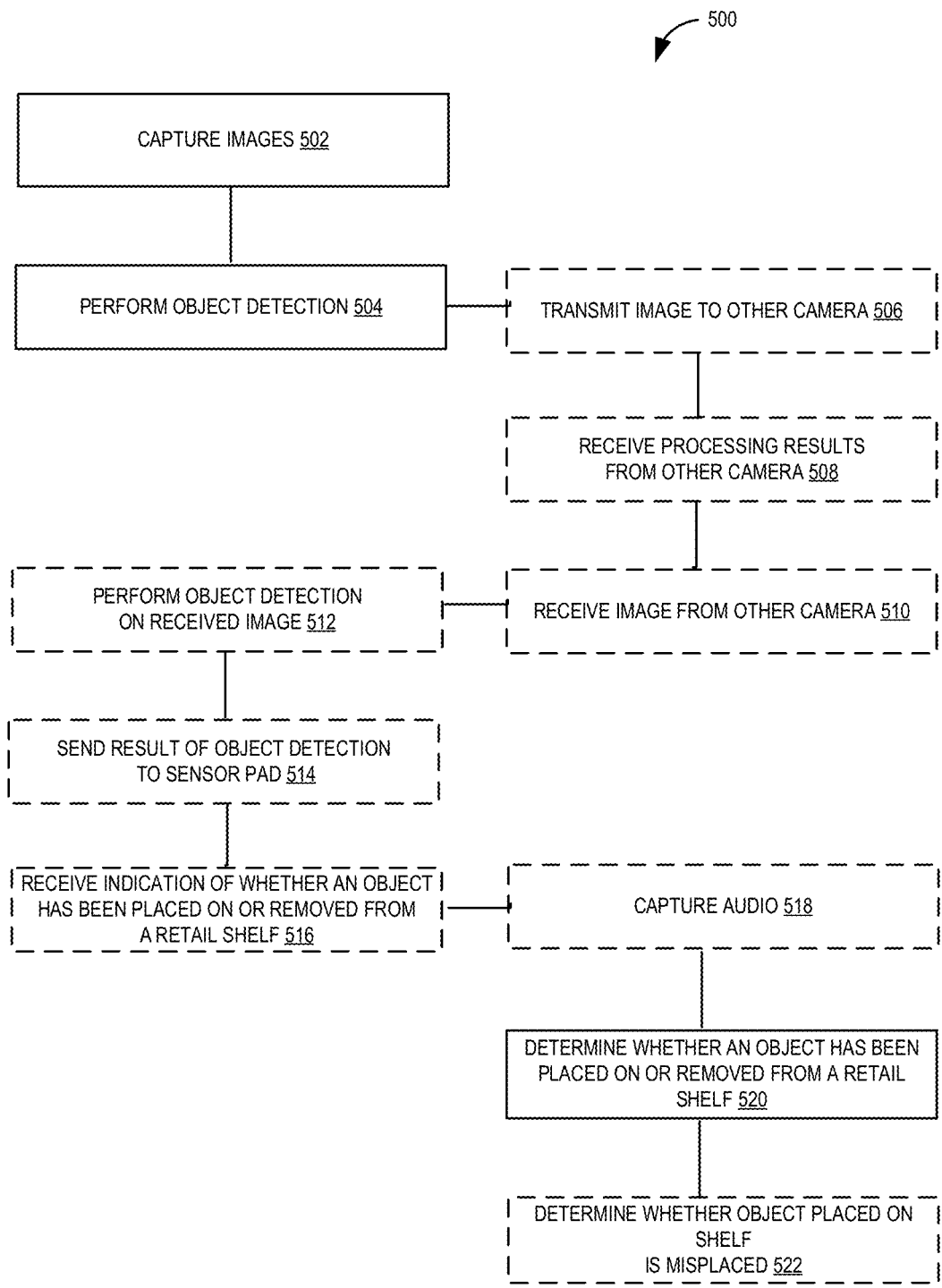
FIG. 5 illustrates one embodiment of a method performed by a camera system of detecting and identifying objects in accordance with various aspects as described herein.

FIG. 5 illustrates one embodiment of a method 500 performed by a camera system 200, 300, 400 of detecting and identifying objects in accordance with various aspects as described herein. In various examples, the method 500 may be performed by any of the processors described herein. Although the steps of method 500 are presented in a particular order, this is only for simplicity. The steps of method 500 may be performed in a different order and/or not every step may be performed. In step 502, a plurality of images may be captured by a camera, such as any one of camera systems 200, 300, 400. In various examples, the plurality of images may represent a portion of retail space, such as a retail shelf, within a retail location. In step 504, one or more of the captured images are processed to perform object detection. For example, the plurality of images may represent multiple objects of merchandise on a retail shelf. In this example, the plurality of images may also represent an individual, such as a shopper, reaching in and removing one of the merchandise items from the shelf. As such, step 504 in this example may detect not only the various merchandise objects, but also one or more body parts of the individual. In optional step 506, one or more of the captured images may be transmitted to another camera. For example, during a period of time when a shopper is removing an object from a shelf, the camera capturing images may not have sufficient processing power to perform object detection on an increased number of captured images. In this example, the camera may utilize processing resources of a neighboring camera to perform any necessary additional processing.

Alternatively, or in addition, the camera capturing images may share one or more images with another camera in order to synchronize processing between the multiple cameras. In this alternate example, the other camera may utilize the received image in order to identify images captured during the same timeframe, but from the perspective of the other camera. The other camera may then process those corresponding images to also perform object detection during the same time period.

In optional step 508, a camera may receive processing results from another camera. For example, the received processing results may represent object detection performed on behalf of the camera by the other camera. Alternatively, or in addition, the received processing results may represent object detection performed by the other camera on images captured and processed by the other camera. In optional step 510, the camera may receive an image from another camera and, in optional step 512, the camera may process the received images to perform object detection. Of note, optional steps 510 and 512 correspond to optional steps 506 and 508 being performed by another camera. That is, the camera may perform optional steps 510 and 512 in response to another camera performing optional steps 506 and 508. In optional step 514, results of performed object detection may be sent to a corresponding sensor pad. In various examples, a sensor pad is configured to detect, identify, and classify an object placed on or removed from a retail shelf based on weight and/or other measurements performed by the sensor pad. In one example, the sensor pad may also utilize information (e.g., object detection results) received from the camera. In optional step 516, the camera may receive an indication of whether an object has been placed on or removed from a retail shelf. For example, a corresponding sensor pad positioned on a corresponding retail shelf may utilize weight and/or other measurements to determine whether an object has been placed on or removed from the retail shelf. The sensor pad may share an indication of this determination with the camera. In turn, the camera may utilize this indication as part of the camera's own determine of whether an object has been placed on or removed from the retail shelf.

In optional step 518, a camera may utilize a microphone or other audio capture module to capture audio from a surrounding area. As part of this step, the camera may also process the captured audio. For example, the lack of audio in the surrounding area may be indicative that no one is present. Similarly, the presence of audio in the surrounding area may be indicative that someone is present and the amount or volume of audio may be indicative of multiple people present. In step 520, the camera may determine whether an object has been placed on or removed from a retail shelf. In various examples, the camera may make such determination based at least in part on the performed object detection. In other examples, the camera may make such determination based at least in part on processing results received from another camera, an indication received from a sensor pad, and/or processed captured audio. In optional step 522, the camera may determine whether an object placed on a shelf is misplaced. For example, the camera, in step 520, may determine that an object has been placed on a shelf. However, the object placed on the shelf may not belong on that shelf (e.g., a cake mix placed where cereal should be). In various examples, the camera may include a floor plan and/or other information indicating proper positioning for various objects. The camera then may utilize this additional information to determine whether an object placed on a shelf is misplaced or not.

Figure 6:
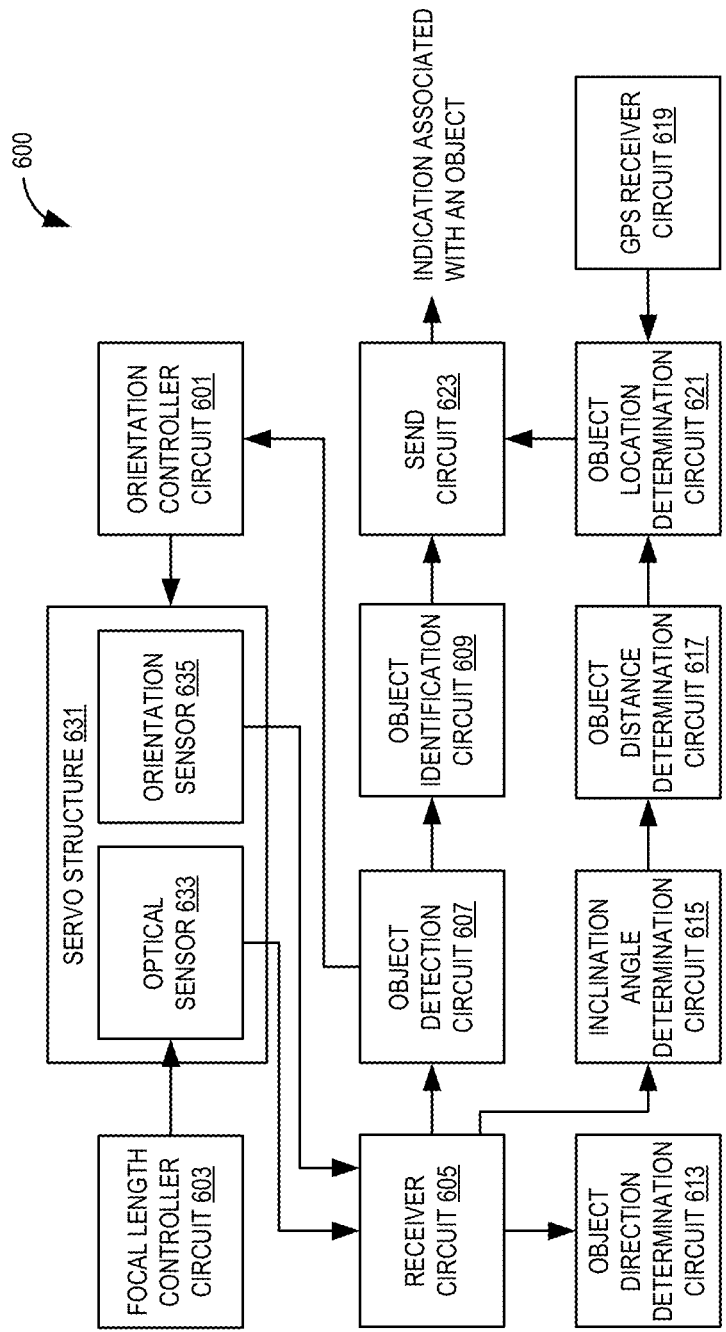
FIG. 6 illustrates another embodiment of a network node in accordance with various aspects as described herein.

FIG. 6 illustrates one embodiment of a network node 600 in accordance with various aspects as described herein. The network node 600 may include all or any portion of the camera systems 200, 300, 400 described herein. In FIG. 6, the node 600 implements various functional means, units, or modules (e.g., via the processing circuitry 701 in FIG. 7, via software code), or circuits. In one embodiment, these functional means, units, modules, or circuits (e.g., for implementing the method(s) herein) may include for instance: an orientation controller circuit 601 operable to control a spatial orientation of an optical sensor of the network node so that the optical sensor has a viewing angle towards an object; a focal length controller circuit 603 operable to control a focal length of the optical sensor so that the object is captured in a larger portion of each image; a receiver circuit 605 operable to receive, from the optical sensor, one or more images of the object; an object detection circuit 607 operable to detect the object based on the one or more captured images; an object identifying circuit 609 operable to identify the object based on the one or more captured images; and a send circuit 623 operable to send, to another network node over a wireless communication channel, an indication associated with the object that is detected and identified by the network node based on the one more images of that object that are captured by the optical sensor of the network node.

In another embodiment, these functional means, units, modules, or circuits (e.g., for implementing the method(s) herein) may include for instance: an orientation controller circuit 601 operable to controlling a spatial orientation of an optical sensor of the network node so that the optical sensor has a viewing angle towards an object; a receiver circuit 605 operable to receive, from a spatial orientation sensor of the network node, a spatial orientation of the optical sensor; an object direction determination circuit 613 operable to determine a direction of the object relative to the network node based on the spatial orientation of the optical sensor; an inclination angle determination circuit 615 operable to determine an angle of inclination of the optical sensor relative to an object based on the spatial orientation of the optical sensor; an object distance determination circuit 617 operable to determine the distance of the object relative to the network node based on the angle of inclination of the optical sensor; a GPS receiver circuit 619 operable to receive a location of the network node; an object location determining circuit 621 operable to determine a location of the object based on the location of the network node and the distance and the direction of the object relative to the network node; and a send circuit 623 operable to send, to another network node over a wireless communication channel, an indication associated with the location of the object that is detected and identified by the network node based on the one more images of that object that are captured by the optical sensor of the network node.

Figure 7:
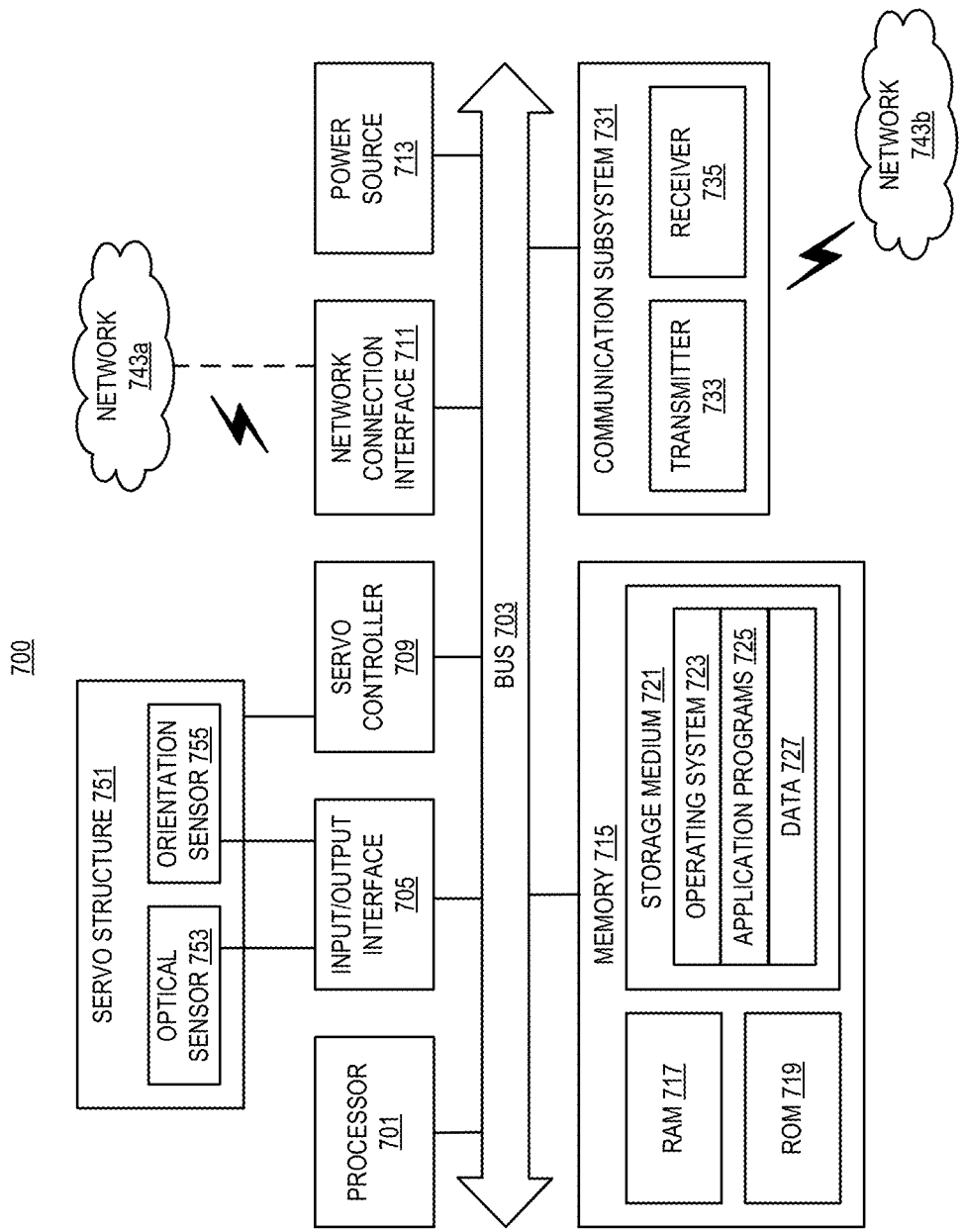
FIG. 7 illustrates another embodiment of a network node in accordance with various aspects as described herein.

FIG. 7 illustrates another embodiment of a network node 700 in accordance with various aspects as described herein. The network node 700 may include all or any portion of the camera systems 200, 300, 400 described herein. In FIG. 7, the network node 700 includes a servo structure 751 that is configured to orient an optical sensor 753 (e.g., camera) such as towards an object. In addition to the optical sensor 753, the servo structure 751 also includes an orientation sensor 755 (e.g., gyroscope) that is configured to measure the orientation of the optical sensor 753. Further, the network node 700 includes processing circuitry 701 that is operatively coupled to input/output interface 705, a servo controller 709, network connection interface 711, memory 715 including random access memory (RAM) 717, read-only memory (ROM) 719, and storage medium 721 or the like, communication subsystem 731, power source 713, and/or any other component, or any combination thereof. The storage medium 721 includes an operating system 723, one or more application programs 725, and data 727. In other embodiments, the storage medium 721 may include other similar types of information. Certain systems may utilize all of the components shown in FIG. 7, or only a subset of the components. The level of integration between the components may vary from one system to another system. Further, certain systems may contain multiple instances of a component, such as multiple processors, memories, neural networks, network connection interfaces, transceivers, etc.

In FIG. 7, the processing circuitry 701 may be configured to process computer instructions and data. The processing circuitry 701 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 701 may include two central processing units (CPUs). Data may be information in a form suitable for use by a computer.

In the depicted embodiment, the input/output interface 705 may be configured to provide a communication interface to an input device, output device, or input and output device. The system 700 may be configured to use an output device via input/output interface 705. An output device may use the same type of interface port as an input device. For example, a USB port may be used to provide input to and output from the system 700. The output device may be a speaker, a sound card, a video card, a display, a monitor, a printer, an actuator, an emitter, a smartcard, another output device, or any combination thereof. The system 700 may be configured to use an input device via input/output interface 705 to allow a user to capture information into the system 700. The input device may include a touch-sensitive or presence-sensitive display, an optical sensor (e.g., a digital camera, a digital video camera, a web camera, etc.), an orientation sensor (e.g., accelerometer, gyroscope, magnetometer or the like), another sensor, a microphone, a mouse, a trackball, a directional pad, a trackpad, a scroll wheel, a smartcard, and the like. The presence-sensitive display may include a capacitive or resistive touch sensor to sense input from a user. The other sensor may be, for instance, an accelerometer, a gyroscope, a tilt sensor, a force sensor, a magnetometer, an optical sensor, an infrared sensor, a proximity sensor, another like sensor, or any combination thereof.

In FIG. 7, the servo controller 709 may be configured to control one or more servos of the servo structure 751 so as to control an orientation of the optical sensor 753. The servo controller 709 may be configured to send to each servo of the servo structure 751 a signal (e.g., pulse-width modulation signal) to control the position of that server. In one example, the servo structure 751 includes two servos with a first servo to control the pitch of the optical sensor 753 and a second servo to control the yaw of the optical sensor 753. The network connection interface 711 may be configured to provide a communication interface to network 743a. The network 743a may encompass wired and/or wireless networks such as a local-area network (LAN), a wide-area network (WAN), a computer network, a wireless network, a telecommunications network, another like network or any combination thereof. For example, network 743a may comprise a Wi-Fi network. The network connection interface 711 may be configured to include a receiver and a transmitter interface used to communicate with one or more other devices over a communication network according to one or more communication protocols, such as Ethernet, TCP/IP, SONET, ATM, or the like. The network connection interface 711 may implement receiver and transmitter functionality appropriate to the communication network links (e.g., optical, electrical, and the like). The transmitter and receiver functions may share circuit components, software or firmware, or alternatively may be implemented separately.

The RAM 717 may be configured to interface via a bus 703 to the processing circuitry 701 to provide storage or caching of data or computer instructions during the execution of software programs such as the operating system, application programs, and device drivers. The ROM 719 may be configured to provide computer instructions or data to processing circuitry 701. For example, the ROM 719 may be configured to store invariant low-level system code or data for basic system functions such as basic input and output (I/O), startup, or reception of keystrokes from a keyboard that are stored in a non-volatile memory. The storage medium 721 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, the storage medium 721 may be configured to include an operating system 723, an application program 725 such as a produce item selection program, a widget or gadget engine or another application, and a data file 727. The storage medium 721 may store, for use by the system 700, any of a variety of various operating systems or combinations of operating systems.

The storage medium 721 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. The storage medium 721 may allow the system 700 to access computer-executable instructions, application programs or the like, stored on transitory or non-transitory memory media, to off-load data, or to upload data. An article of manufacture, such as one utilizing a communication system may be tangibly embodied in the storage medium 721, which may comprise a device readable medium.

In FIG. 7, the processing circuitry 701 may be configured to communicate with network 743b using the communication subsystem 731. The network 743a and the network 743b may be the same network or networks or different network or networks. The communication subsystem 731 may be configured to include one or more transceivers used to communicate with the network 743b. For example, the communication subsystem 731 may be configured to include one or more transceivers used to communicate with one or more remote transceivers of another system capable of wireless communication according to one or more communication protocols, such as IEEE 802.11, CDMA, WCDMA, GSM, LTE, UTRAN, WiMax, or the like. Each transceiver may include transmitter 733 and/or receiver 735 to implement transmitter or receiver functionality, respectively, appropriate to the RAN links (e.g., frequency allocations and the like). Further, transmitter 733 and receiver 735 of each transceiver may share circuit components, software or firmware, or alternatively may be implemented separately.

In the illustrated embodiment, the communication functions of the communication subsystem 731 may include data communication, voice communication, multimedia communication, short-range communications such as Bluetooth, near-field communication, location-based communication such as the use of the global positioning system (GPS) to determine a location, another like communication function, or any combination thereof. For example, the communication subsystem 731 may include cellular communication, Wi-Fi communication, Bluetooth communication, and GPS communication. Further, the communication subsystem 731 may include functions to determine the presence or proximity of a wireless device to the system 700 or any of its components such as the sensor pad 751. For example, the communication subsystem 731 may include a Bluetooth transceiver that is operable to determine the presence or proximity of a wireless device to the sensor pad 751, with the wireless device also having a Bluetooth transceiver. A skilled artisan will readily recognize various algorithms for determining the presence or proximity of a wireless device. In addition, the system 700 via the Bluetooth transceiver of the communication subsystem 731 may obtain various information from each detected Bluetooth device such as a device name, a Bluetooth address, a device type, a first detection time, a last detection time, or the like. A wireless device may be referred to as a user equipment (UE), a mobile station (MS), a terminal, a cellular phone, a cellular handset, a personal digital assistant (PDA), a smartphone, a wireless phone, an organizer, a handheld computer, a desktop computer, a laptop computer, a tablet computer, a set-top box, a television, an appliance, a game device, a medical device, a display device, a metering device, or some other like terminology. The network 743b may encompass wired and/or wireless networks such as a local-area network (LAN), a wide-area network (WAN), a computer network, a wireless network, a telecommunications network, another like network or any combination thereof. For example, the network 743b may be a cellular network, a Wi-Fi network, and/or a near-field network. The power source 713 may be configured to provide alternating current (AC) or direct current (DC) power to components of the system 700.

The features, benefits and/or functions described herein may be implemented in one of the components of the system 700 or partitioned across multiple components of the system 700. Further, the features, benefits, and/or functions described herein may be implemented in any combination of hardware, software or firmware. In one example, communication subsystem 731 may be configured to include any of the components described herein. Further, the processing circuitry 701 may be configured to communicate with any of such components over the bus 703. In another example, any of such components may be represented by program instructions stored in memory that when executed by the processing circuitry 701 perform the corresponding functions described herein. In another example, the functionality of any of such components may be partitioned between the processing circuitry 701 and the communication subsystem 731. In another example, the non-computationally intensive functions of any of such components may be implemented in software or firmware and the computationally intensive functions may be implemented in hardware.

Figure 8:
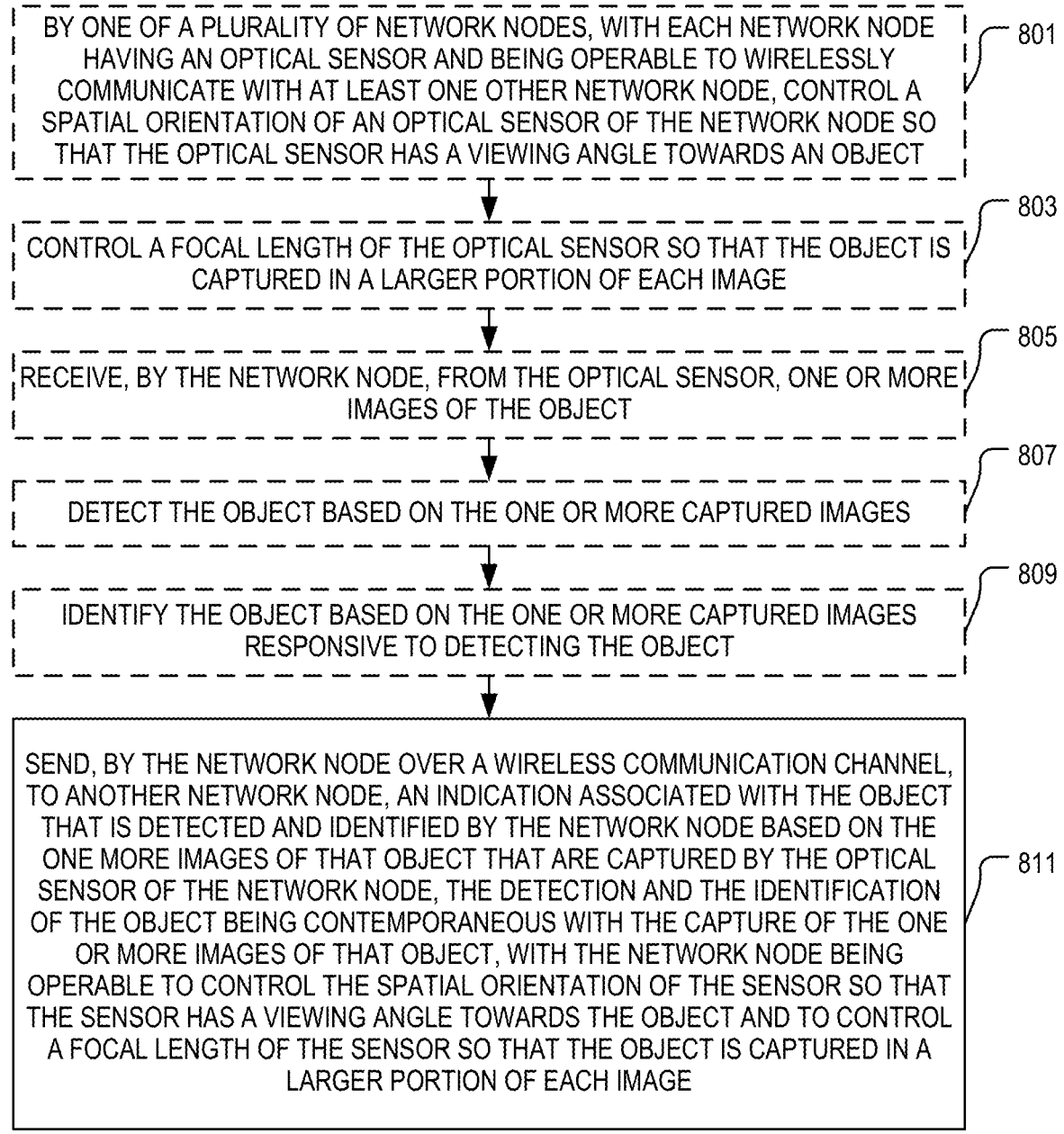
FIG. 8 illustrates another embodiment of a method performed by a network node of detecting and identifying objects in accordance with various aspects as described herein.

FIG. 8 illustrates another embodiment of a method 800 performed by a network node of detecting and identifying objects in accordance with various aspects as described herein. In FIG. 8, the method 800 may start, for instance, at block 801 where it may include controlling a spatial orientation of an optical sensor of the network node so that the optical sensor has a viewing angle towards an object. At block 803, the method 800 may include controlling a focal length of the optical sensor so that the object is captured in a larger portion of each image. At block 805, the method 800 may include receiving, by the network node, from the optical sensor, one or more images of the object. Further, the method 800 may include detecting the object based on the one or more captured images, as represented by block 807. The method 800 may also include identifying the object based on the one or more captured images responsive to detecting the object, as represented by block 809. At block 811, the method includes sending, by the network node over a wireless communication channel, to another network node, an indication associated with the object that is detected and identified by the network node based on the one more images of that object that are captured by the optical sensor of the network node. Further, the detection and the identification of the object is contemporaneous with the capture of the one or more images of that object. In one example, the object is detected and identified within five seconds of the capture of the one or more images of that object. In another example, the object is detected and identified within one second of the capture of the one or more images of that object. In yet another example, the object is detected and identified within five hundred milliseconds of the capture of the one or more images of that object. Also, the network node is operable to control the spatial orientation of the sensor so that the sensor has a viewing angle towards the object and to control a focal length of the sensor so that the object is captured in a larger portion of each image.

Figure 9:
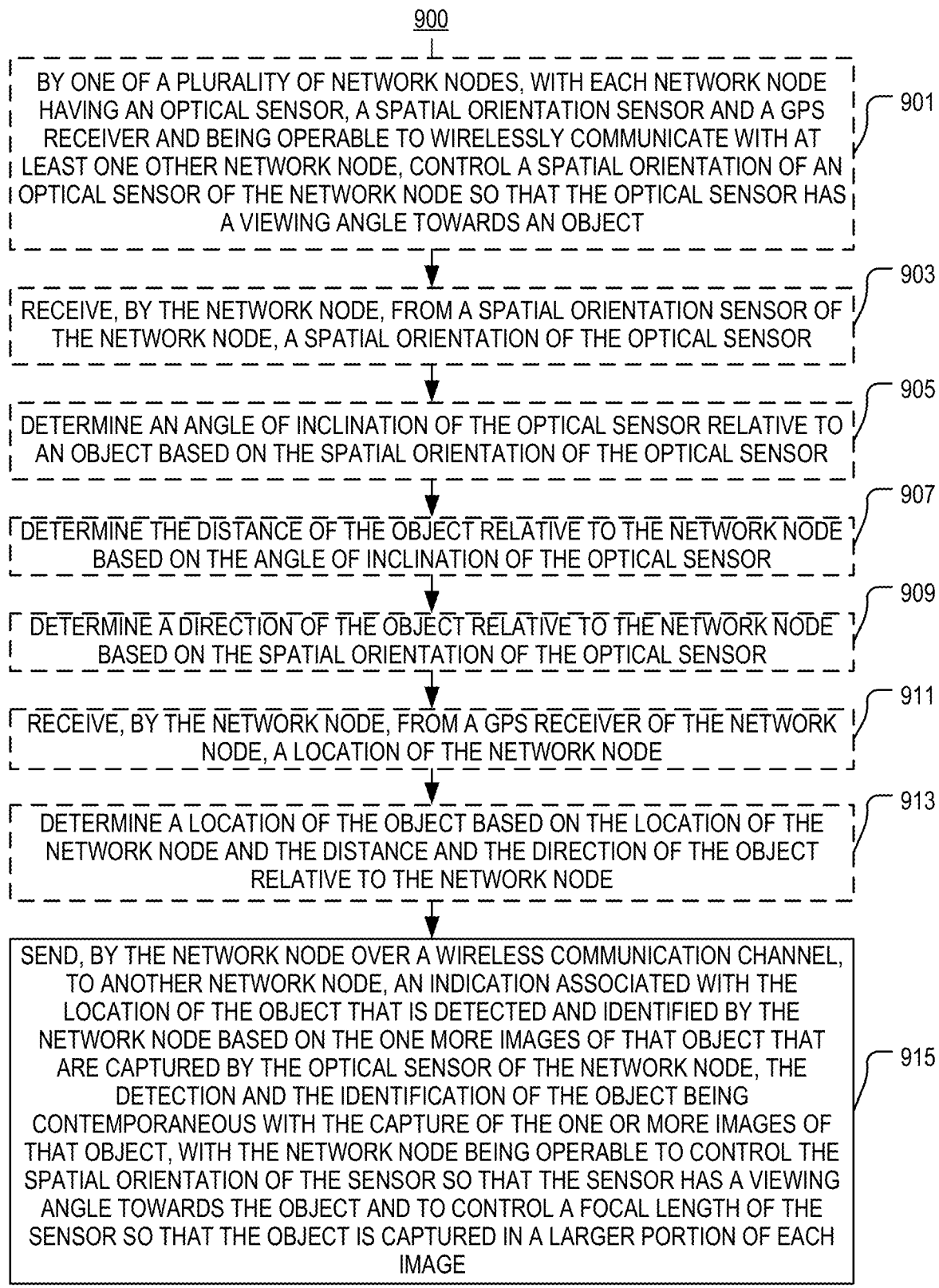
FIG. 9 illustrates another embodiment of a method performed by a network node of detecting and identifying objects in accordance with various aspects as described herein.

FIG. 9 illustrates another embodiment of a method 900 performed by a network node of detecting and identifying objects in accordance with various aspects as described herein. In FIG. 9, the method 900 may start, for instance, at block 901 where it may include controlling a spatial orientation of an optical sensor of the network node so that the optical sensor has a viewing angle towards an object. At block 903, the method 900 may include receiving, by the network node, from a spatial orientation sensor of the network node, a spatial orientation of the optical sensor. The method 900 may include determining an angle of inclination of the optical sensor relative to an object based on the spatial orientation of the optical sensor, as represented by block 905. Further, the method 900 may include determining the distance of the object relative to the network node based on the angle of inclination of the optical sensor, as represented by block 907. In addition, the method 900 may include determining a direction of the object relative to the network node based on the spatial orientation of the optical sensor, as represented by block 909. At block 911, the method 900 may include receiving, by the network node, from a GPS receiver of the network node, a location of the network node. At block 913, the method 900 may include determining a location of the object based on the location of the network node and the distance and the direction of the object relative to the network node. At block 915, the method 900 may include sending, by the network node over a wireless communication channel, to another network node, an indication associated with the location of the object that is detected and identified by the network node based on the one more images of that object that are captured by the optical sensor of the network node. Further, the detection and the identification of the object being contemporaneous with the capture of the one or more images of that object. Also, the network node is operable to control the spatial orientation of the sensor so that the sensor has a viewing angle towards the object and to control a focal length of the sensor so that the object is captured in a larger portion of each image The previous detailed description is merely illustrative in nature and is not intended to limit the present disclosure, or the application and uses of the present disclosure. Furthermore, there is no intention to be bound by any expressed or implied theory presented in the preceding field of use, background, summary, or detailed description. The present disclosure provides various examples, embodiments and the like, which may be described herein in terms of functional or logical block elements. The various aspects described herein are presented as methods, devices (or apparatus), systems, or articles of manufacture that may include a number of components, elements, members, modules, nodes, peripherals, or the like. Further, these methods, devices, systems, or articles of manufacture may include or not include additional components, elements, members, modules, nodes, peripherals, or the like.

Furthermore, the various aspects described herein may be implemented using standard programming or engineering techniques to produce software, firmware, hardware (e.g., circuits), or any combination thereof to control a computing device to implement the disclosed subject matter. It will be appreciated that some embodiments may be comprised of one or more generic or specialized processors such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the methods, devices and systems described herein. Alternatively, some or all functions could be implemented by a state machine that has no stored program instructions, or in one or more application specific integrated circuits (ASICs), in which each function or some combinations of certain of the functions are implemented as custom logic circuits. Of course, a combination of the two approaches may be used. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The term "article of manufacture" as used herein is intended to encompass a computer program accessible from any computing device, carrier, or media. For example, a computer-readable medium may include: a magnetic storage device such as a hard disk, a floppy disk or a magnetic strip; an optical disk such as a compact disk (CD) or digital versatile disk (DVD); a smart card; and a flash memory device such as a card, stick or key drive. Additionally, it should be appreciated that a carrier wave may be employed to carry computer-readable electronic data including those used in transmitting and receiving electronic data such as electronic mail (e-mail) or in accessing a computer network such as the Internet or a local area network (LAN). Of course, a person of ordinary skill in the art will recognize many modifications may be made to this configuration without departing from the scope or spirit of the subject matter of this disclosure.

Throughout the specification and the embodiments, the following terms take at least the meanings explicitly associated herein, unless the context clearly dictates otherwise. Relational terms such as "first" and "second," and the like may be used solely to distinguish one entity or action from another entity or action without necessarily requiring or implying any actual such relationship or order between such entities or actions. The term "or" is intended to mean an inclusive "or" unless specified otherwise or clear from the context to be directed to an exclusive form. Further, the terms "a," "an," and "the" are intended to mean one or more unless specified otherwise or clear from the context to be directed to a singular form. The term "include" and its various forms are intended to mean including but not limited to. References to "one embodiment," "an embodiment," "example embodiment," "various embodiments," and other like terms indicate that the embodiments of the disclosed technology so described may include a particular function, feature, structure, or characteristic, but not every embodiment necessarily includes the particular function, feature, structure, or characteristic. Further, repeated use of the phrase "in one embodiment" does not necessarily refer to the same embodiment, although it may. The terms "substantially," "essentially," "approximately," "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. A device or structure that is "configured" in a certain way is configured in at least that way, but may also be configured in ways that are not listed.

What is claimed is:

1. A method, comprising:
by a first network node of a plurality of network nodes, with each network node having an optical sensor intergrated with a processings circuit that is operable to perform object detection, controlling a spatial orientation of the optical sensor of the first network node to have a viewing angle towards an object positioned in a first area;
controlling a focal length of the optical sensor of the first network node so that the object is captured in a larger portion of an image;
capturing, through the optical sensor of the first network node, one or more images of the object; and
responsive to determining that a processing power of the processings circuit of the first network node is less than a processing power threshold associated with performing the object detection of the object on the one or more images of the object:
sending, by the first network node, to a second network node of the plurality of network nodes, at least one of the one or more images of the object, with the second network node being operable to perform the object detection on the at least one of the one or more images of the object contemporaneous with the first network node capturing the one or more images of the object;
receiving, by the first network node, from the second network node, a first indication associated with the detected object; and
determining that the detected object is removed from the first area based on the one or more images; and
sending, by the first network node, to a third network node of the plurality of network nodes, a second indication associated with the object being removed from the first area.

2. The method of claim 1, further comprising:
identifying the object based on the one or more captured images responsive to the receiving the first indication associated with the detected object.

3. The method of claim 1, wherein the controlling the spatial orientation of the optical sensor includes controlling a pan or tilt of the optical sensor.

4. The method of claim 1, wherein the controlling the focal length of the optical sensor is responsive to the controlling the spatial orientation of the optical sensor.

5. The method of claim 1, further comprising:
determining a distance and a direction of the object relative to the first network node based on the spatial orientation of the optical sensor and a height of the optical sensor relative to a predetermined reference point.

6. The method of claim 5, further comprising:
sending, by the first network node, to the second network node, an indication associated with the distance and the direction of the object relative to the first network node.

7. The method of claim 5, further comprising:
receiving, by the first network node, from a spatial orientation sensor of the first network node, the spatial orientation of the optical sensor.

8. The method of claim 7, further comprising:
determining an angle of inclination of the optical sensor relative to the object based on the spatial orientation of the optical sensor; and
determining the distance of the object relative to the first network node based on the angle of inclination of the optical sensor.

9. The method of claim 5, further comprising:
receiving, by the first network node, from a global positioning system (GPS) receiver of the first network node, a location of the first network node; and
determining a location of the object based on the location of the network node and the distance and the direction of the object relative to the network node; and
sending, by the first network node, to the second network node, an indication associated with the location of the object.

10. The method of claim 1, further comprising:
determining that a parking space is full based on the detected and identified object, wherein the object is associated with the parking space; and
sending, by the first network node, to the second network node, an indication that the parking space is full.

11. The method of claim 1, further comprising:
receiving, by the first network node, from the optical sensor, the one or more images of the object.

12. The method of claim 1, wherein the plurality of network nodes is operable as a wireless mesh network.

13. The method of claim 1, wherein the plurality of network nodes wirelessly communicate over a Wireless Fidelity (Wi-Fi) network.

14. The method of claim 1, wherein the object is detected and identified within one second from the capture of the one or more images of the object.

15. The method of claim 1, further comprising:
sending, by the first network node, to the second network node, the at least one of the one or more images of the object that are captured by the optical sensor of the first network node so that the second network node is enabled to time synchronize these images with one or more images of the object that are captured by the optical sensor of the second network node and to process the time synchronized images to identify the object, with the optical sensor of the first network node and the optical sensor of the second network node having different viewing angles towards the object.

16. The method of claim 1, wherein the first network node is operable to distribute to the second network node at least a portion of processing to identify the object.

17. The method of claim 1, wherein the optical sensor includes a camera, with the camera being positioned above and in front of the retail shelf so that the viewing angle of the camera is down and towards the front of the retail shelf.

18. The method of claim 1, wherein the one or more captured images include one or more objects representing one or more retail items positioned in the first area.

19. A first network node of a plurality of network nodes, with each network node having an optical sensor and being operable to communicate with at least one other network node, comprising:
an optical sensor integrated with a processor that is operable to perform object detection, and
a memory, the memory containing instructions executable by the processor whereby the processor is configured to:
control a spatial orientation of the optical sensor of the first network node to have a viewing angle towards an object positioned in a first area;
control a focal length of the optical sensor so that the object is captured in a larger portion of an image;
capture, through the optical sensor, one or more images of the object; and
responsive to determining that a processing power of the first network node is less than a processing power threshold associated with performing object detection of the object on the one or more images of the object:
send, to a second network node of the plurality of network nodes, at least one of the one or more images of the object, with the second network node being operable to perform the object detection on the at least one of the one or more images of the object contemporaneous with the capturing of the one or more images of the object;
receive, from the second network node, a first indication associated with the detected object;
determine that detected object is removed from the first area based on the one or more images; and
send, to a third network node of the plurality of network nodes, a second indication associated with the object being removed from the first area, with each network node of the plurality of network nodes having an optical sensor integrated with a processor that is operable to perform object detection.

20. A method, comprising:
by a second network node of a plurality of network nodes, with each network node having an optical sensor intergrated with a processings circuit that is operable to perform object detection, receiving, by the second network node, from a first network node of the plurality of network nodes, one or more images of an object positioned in a first area that are captured by an optical sensor of the first network node, with the first network node being operable to send the one or more images of the object to the second network node responsive to determining that a processing power of the first network node is less than a processing power threshold associated with performing object detection of the object on the one or more images of the object;
performing object detection of the object on the one or more images of the object contemporaneous with the capturing of the one or more images of the object; and
sending, by the second network node, to the first network node, an indication associated with the detected object.

21. The method of claim 20, further comprising:
identifying the detected object based on the one or more images; and
sending, by the second network node, to the first network node, an indication of the identified object.

22. The method of claim 20, wherein the performing the object detection is responsive to determining that a processing power of the first network node is less than a processing power threshold associated with performing object detection of the object on the one or more images of the object.

23. A second network node of a plurality of network nodes, with each network node having an optical sensor and being operable to communicate with at least one other network node, comprising:
   an optical sensor integrated with a processor that is operable to perform object detection, and
   a memory, the memory containing instructions executable by the processor whereby the network node is configured to:
      receive, from a first network node of the plurality of network nodes, one or more images of an object positioned in a first area that is captured by an optical sensor of the first network node, with the first network node being operable to send the one or more images of the object to the second network node responsive to determining that a processing power of the first network node is less than a processing power threshold associated with performing object detection of the object on the one or more images of the object;
      perform object detection of the object on the one or more images of the object contemporaneous with the capturing of the one or more images of the object; and
      send, to the first network node, an indication associated with the detected.

* * * * *